Sept. 16, 1947.          S. S. WEST                    2,427,484
                    IONIC GAS ANALYSIS
            Filed Oct. 22, 1943            3 Sheets-Sheet 1

Inventor:-
Samuel S. West
By Paul F. Hawley
    Patent Agent

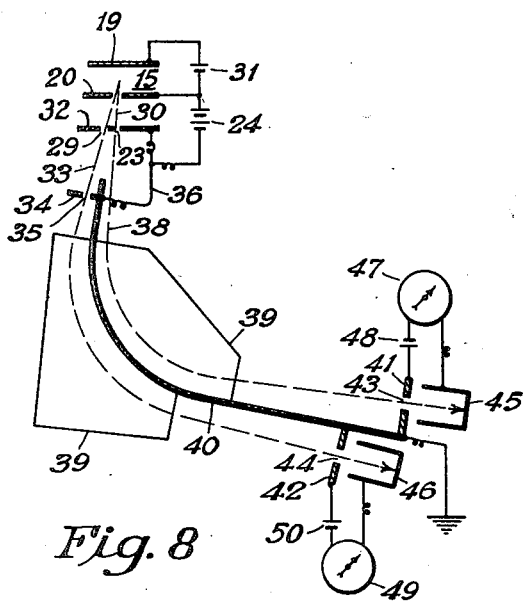
Fig. 8
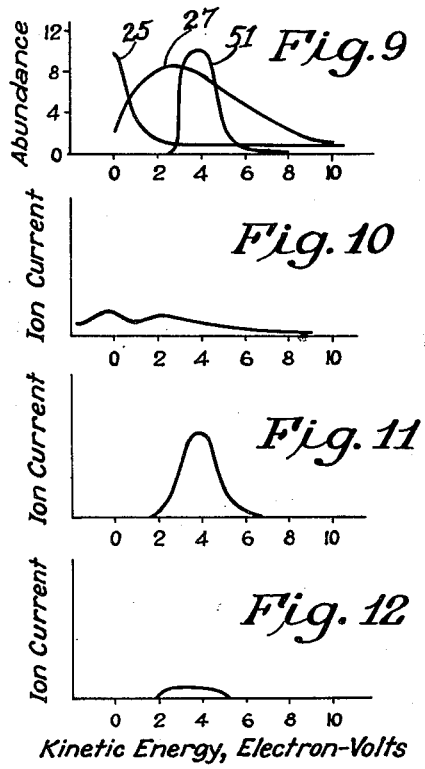
Fig. 9
Fig. 10
Fig. 11
Fig. 12
Kinetic Energy, Electron-Volts
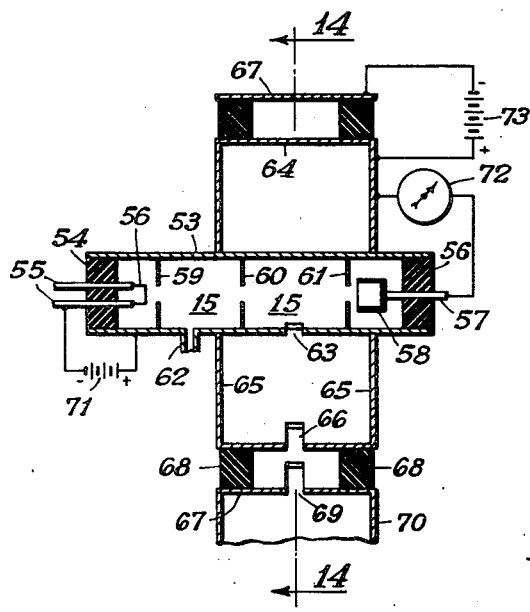
Fig. 13
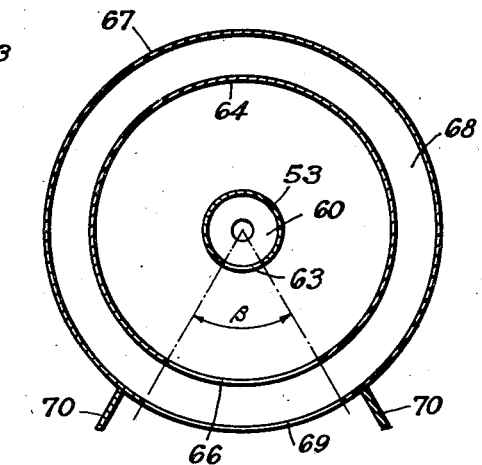
Fig. 14
Inventor:—
Samuel S. West
By Paul F. Hawley
Patent Agent Sept. 16, 1947.   S. S. WEST   2,427,484
IONIC GAS ANALYSIS
Filed Oct. 22, 1943   3 Sheets-Sheet 3

Inventor:—
Samuel S. West
By Paul F. Hawley
Patent Agent

Patented Sept. 16, 1947

2,427,484

UNITED STATES PATENT OFFICE 2,427,484

IONIC GAS ANALYSIS

Samuel S. West, Tulsa, Okla., assignor to Stanolind Oil and Gas Company, Tulsa, Okla., a corporation of Delaware Application October 22, 1943, Serial No. 507,303

5 Claims. (Cl. 73—18)

This invention pertains to the art of analytical procedures, particularly to methods and apparatus for ionic analysis of gases. The invention finds particular application in the art of mass-spectrometry.

It is known that where a substance in the form of a gas is passed into a zone of low pressure, and a beam of electrons is directed into this zone, ions are formed. Some of these ions acquire kinetic energy of finite amounts during the process of ionization, while others are formed with substantially zero kinetic energy. Those possessing finite kinetic energy, therefore, are moving at a velocity which can be considerably greater than the average velocity of the gas molecules in the ionization zone.

The relative abundance of the ions of definite initial kinetic energies is now known to be directly associated with the type of molecule from which the ion came. Thus, for example, the relative abundance of ions of definite initial kinetic energies in the case of the singly charged oxygen ion from carbon dioxide is quite different from that of the same oxygen ion from nitrous oxide.

In the customary form of mass-spectrometer, an electric field transverse to the electron beam is used to draw ions out of the ionization zone. These ions pass through a slit and are accelerated to a second slit by a strong electric field between the metal plates in which the slits are cut. Since the initial velocities of those ions formed with kinetic energy are in a random direction, most of these ions have so large a velocity component perpendicular to the two electric fields that they do not pass through the second slit, even though they have passed through the first slit. Thus the slit system selects the ions in such a way as to exclude practically all of those with initial kinetic energy.

All mass spectrometers with which I am acquainted, constructed for the study of ions produced in a gas, are of the type just described. Such mass spectrometers are definitely undesirable for the study of many ions produced from the disassociation of molecules due to the fact that they exclude nearly all of the ions possessing initial kinetic energy. There are at least two very marked disadvantages in this connection:

1. Measured abundances of ions here depend on the geometry of the ion source, so that mass-spectra from one instrument cannot be compared with mass-spectra from another.

2. It is not possible to measure the distribution of abundance as a function of the kinetic energy for a given ion. This distribution function is characteristic of the molecule from which the ion was derived (the source-molecule), so that the scope of analysis can be extended by using it to distinguish between the different sources of the same ion.

I have found that it is possible to overcome these disadvantages by means of the invention described herein. The method and apparatus described below possess, among others, the following objects and advantages: More than twice as many measurements or parameters descriptive of the process of disassociation of molecules under electron impact are produced compared with those obtainable with the conventional mass-spectrometer. One can distinguish between the source-molecules of a given ion, and even determine their concentrations quantitatively, thereby increasing the number of compounds whose concentrations in a mixture can be determined by mass-spectrometry. It is possible, using my invention, to employ for analysis only the most abundant ions in mass-spectra by considering each in terms of its distribution in initial kinetic energy. The analysis is thereby made more accurate than could previously be accomplished. Other objects and advantages of this invention will become apparent from the specification and attached drawings.

The drawings included are for the purpose of illustrating certain specific embodiments of the invention, and are not to be considered as limiting its scope. In these drawings the same reference numeral applied in different figures refers to the same or a corresponding part.

Figure 8 is a representation of a particular type of dual mass-spectrometer, illustrating one embodiment of my invention.

Figure 9 is a chart similar to that of Figure 5 but including a plot of the slit efficiency of the system shown in Figure 7.

Figures 10 and 11 show the ion current obtained using the apparatus shown in Figure 8, the ionic characteristic of which was charted in Figure 5.

Figure 12 shows the ion current obtainable using the slit system of Figure 7 and ions of the type the characteristic of which was charted in Figure 3.

Figure 13 illustrates a second embodiment of my invention, in this case a cross-section of particularly advantageous type of ion source for a mass-spectrometer.

Figure 14 is a cross-section of Figure 13 along the line 14—14.

Figure 1:
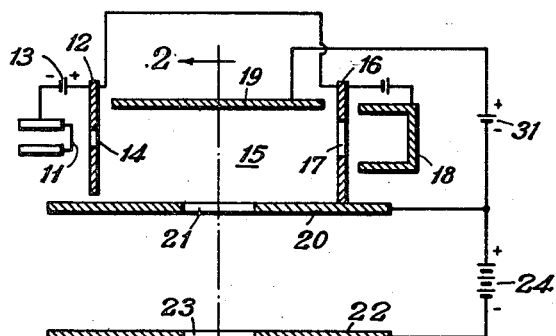
Figure 1 represents diagrammatically a cross-section across the ionizing apparatus of a conventional mass-spectrometer.

In Figure 1 is illustrated one common form of ionization chamber for a mass-spectrometer. The entire apparatus shown in Figure 1 is enclosed in a glass or metal container (not shown) maintained at a subatmospheric pressure, for example, of the order of 0.01 mm. Hg to 0.00001 mm. Hg. The substance to be analyzed is introduced into this region in any of the ways already known to the art. A filament 11 is electrically heated to such a point that it thermionically emits electrons. These electrons are drawn towards a metal plate 12 by a difference of potential from a battery 13 or other source of E. M. F. There is a slit 14 in the plate 12 so that many electrons pass through this slit into zone 15, also maintained at the subatmospheric pressure. Within this zone are large numbers of molecules existing in the gas phase, chiefly molecules of the substance or substances to be analyzed. Electrons pass from plate 12 to plate 16 at a constant velocity which is the velocity attained upon passing through slit 14. The electrons in crossing the zone bombard the gas molecules therein, thus producing ionization by collision. In general the electrons pass through a slit 17 in plate 16 and are collected by a metal cup 18 maintained at a slightly positive potential with respect to the plate 16.

A weak vertical electric field is produced in zone 15 between upper plate 19 and lower plate 20, by means of a source of E. M. F. 31. The positive ions formed in zone 15 by collision are attracted towards plate 20. There is a slit 21 in plate 20 through which positively charged ions can escape from zone 15 under the influence of the vertical electric field. Obviously, no negatively charged particles will tend to pass through this slit since the vertical field would tend to urge all such ions in the direction of plate 19. The positive ions which have passed through slit 21 are accelerated toward another plate 22 by means of a much stronger electric field between plate 20 and plate 22 with battery 24 as a source of E. M. F. The ions passing through slit 23 in plate 22 form a slightly diverging ionic beam, the dimensions and divergence of which are largely established by the dimensions and positions of the various slits and the strengths of the various fields. This beam of ions is composed of a large number of dissimilar ions, the relative abundances of which depend upon the original concentrations of the various materials in the gas in zone 15, the ionizing efficiency in this zone, and the characteristics of the slit system. In the normal mass-spectrometer this ion beam is resolved, i. e. the ions are separated electromagnetically, according to the ratio $$\frac{\text{charge of ion}}{\text{mass of ion}}$$

and the individual ion beams are then measured, usually by determining the strength of the current produced when each of the separated beams is permitted to strike a collecting cup.

Figure 2:
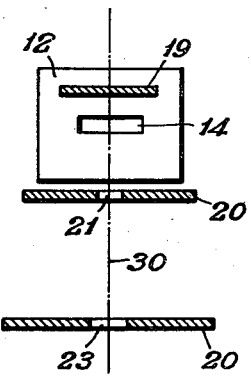
Figure 2 is a cross-section taken along the lines of 2—2 of Figure 1.

It has previously been mentioned that the ionization by bombardment in zone 15 produced ions of zero initial kinetic energy and ions possessing finite initial kinetic energy. The ions of zero kinetic energy, therefore, possess no component of velocity in the direction of the plane defined by the surface of plate 20. Accordingly, nearly all of such positive ions will be drawn approximately vertically downward and will either strike plate 20 or will pass through the slit 21 therein. Since they are now traveling approximately vertically, they will likewise pass through the slit 23 in plate 22. On the other hand, since these slits 21 and 23 are usually of extremely fine dimensions (for example, the width of the slits as shown in Figure 2 may not exceed 0.05 inch), it is apparent that ions having finite initial kinetic energies in general are moving in a non-vertical fashion in zone 15, and hence only a relatively small fraction of such ions pass through slit 23. Since those positive ions which possess initial kinetic energy, and which pass through slit 21, on the average possess a horizontal component of velocity, practically all of such ions will strike plate 22 and will not pass through the slit 23, which is vertically placed below the slit 21 in plate 20, as shown in Figure 2.

As a result, if the relative abundance of a particular type of ion passing through slit 23 is analyzed in terms of the initial kinetic energy of the positive ion, in electron-volts, it will be found that the abundance is a maximum for ions possessing zero kinetic energy, and that the abundance drops off very rapidly as the initial kinetic energy increases. This is illustrated by curve 25 in Figure 3, in which the relative abundance of positive ions passing through the slit system of Figures 1 and 2 is plotted against the initial kinetic energy of these ions, in electron-volts. Such a curve is normally called a slit efficiency curve.

Figure 3:
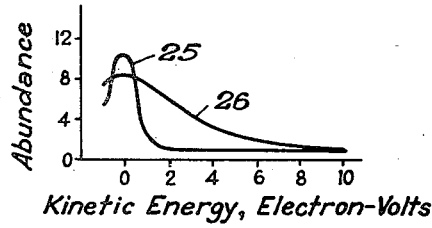
Figure 3 is a plot of the relative abundance of ions produced with various kinetic energies, as a function of the initial ionic kinetic energy, superimposed upon which is a plot of the slit efficiency of the system shown in Figures 1 and 2.
Figure 4:
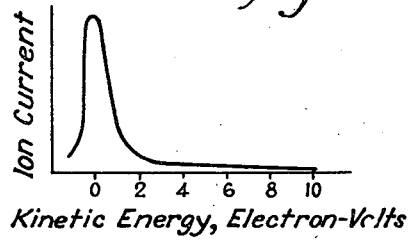
Figure 4 is a chart of the ion current obtained for the slit system shown in Figures 1 and 2 and the type of ions, the abundance of which is given in Figure 3.
Figure 5:
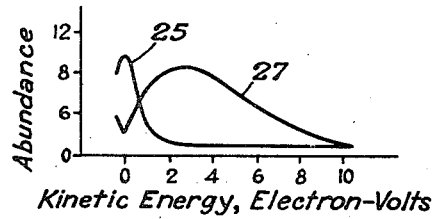
Figure 5 is a chart similar to Figure 3 but representing the relative ionic abundance as a function of the initial kinetic energies of ions, for another ion.
Figure 6:
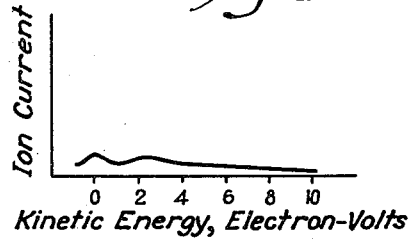
Figure 6 is the corresponding chart of the ion current as a function of the initial kinetic energy of the ion, the characteristic of which was shown in Figure 5, when drawn through the slit system shown in Figures 1 and 2.

If all ions produced by the bombardment in the zone 15 had zero initial kinetic energy when formed, obviously this slit efficiency curve 25 would be excellent. The resultant beam would be quite narrowly defined, and the resultant "peaks" in the mass spectrum would be sharp. However, in most substances, as far as I am aware, the ionization process does not produce ions of zero kinetic energy only. For example, curve 26 in Figure 3 shows the relative abundance of the singly ionized positive carbon ion from carbon monoxide. It is noted that the greatest abundance of the $C^+$ ions are produced with zero initial kinetic energy, but roughly half as many $C^+$ ions are produced having an initial kinetic energy of three electron-volts. It is apparent that by multiplying the ordinates of curves 25 and 26, one obtains a quantity directly proportional to the number of $C^+$ ions escaping per unit time through slit 23, as a function of the initial kinetic energy of these ions. Such a curve, showing the ion current of the $C^+$ ion from CO as a function of the initial kinetic energy of the ions, is shown in Figure 4. On the other hand, it has been found that there are many molecules in which the process of ionization by bombardment produces a great many more ions possessing initial kinetic energy than those possessing no kinetic energy. For example, curve 27 shows the abundance of the $O^+$ ion obtained on the dissociation of nitrous oxide. It is to be noted that the maximum abundance of ions is obtained at an initial kinetic energy between 2 and 3 electron volts, and that the relative abundance of these ions with zero kinetic energy is less than one-quarter as much as that with three electron-volts. Therefore, if nitrous oxide is ionized in zone 15 and the $O^+$ ion formed is withdrawn through slits 21 and 23, it is found that the discriminatory action of these slits against ions with initial kinetic energy, causes no obvious peak to be formed in the curve of ionic current vs. kinetic energy. This can be determined by multiplying together the ordinate of curves 25 and 27 in Figure 5. The resultant curve is plotted in Figure 6, from which it appears that it would be extremely difficult to determine the $O^+$ ion from the NO by the slit system just described.

I have found that it is possible to arrange equipment in such a way that ions having finite initial kinetic energies lying between certain ranges can be selectively removed from the ionization zone, separate from the removal (if any) of ions with substantially no initial kinetic energy, and that thereby, I can eliminate the difficulties inherently present in the mass-spectrometer of former designs. One embodiment of my invention is shown in diagrammatic form in Figure 7. Here, as in Figure 2, there is shown a transverse view of part of the region within an ionization chamber maintained at subatmospheric pressure. The substance to be analyzed is introduced into this subatmospheric zone and passes in front of the slit 14, where it is bombarded with electrons from a filament such as filament 11 located behind slit 14. Plates 19 and 20 are supplied with a difference of potential sufficient to force positive ions in the direction of plate 20. This plate is supplied with a slit 21 as described above. A plate 28 is positioned in the ionization chamber a distance "$a$" below 20. It is provided with a slit 29, which is not directly below the slit in plate 20, but which is displaced from the vertical axis 30 passing through the center of slit 21 perpendicular to the surface of plate 20, by a distance $d$. The dimension of the slit at right angles to the dimensions shown may be of any convenient length, for example, the length of slit 23, as in Figure 1.

Figure 7:
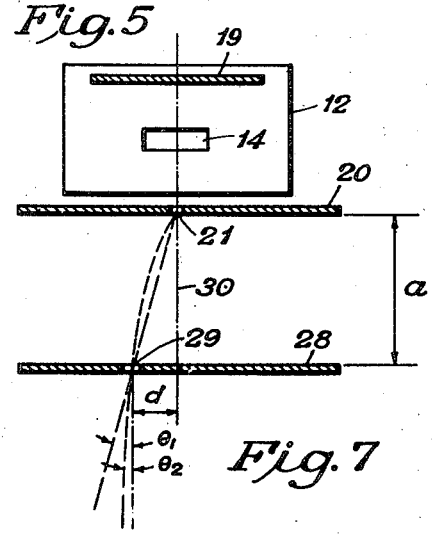
Figure 7 is a diagrammatic representation of one form of slit system advantageous for use in connection with my invention.

It can be shown that a slit system of the type shown in Figure 7 selectively removes from the ionization zone ions, the initial energy of which is not zero, but which lies within predetermined limits. No ion can pass through slit 29 unless it has a velocity parallel to the plates sufficiently great to carry it the distance $d$ in the time that it travels vertically the distance $a$. In computing the velocities of the ion, i. e. what initial kinetic energies permit passage through slit 29, it is only necessary to know the potential difference $V_0$ between the parallel plates and the charge $e$ and mass $m$ of the ions. The minimum component of velocity (in the direction $d$) of the ions passing slit 21, which will permit such ions to pass through slit 29, is designated as $v_1$. This minimum velocity $v_1$ corresponds to a minimum kinetic energy $\frac{1}{2}mv_1^2$. This energy expressed in electron-volts is $V_1$. This horizontal velocity $v_1$ when multiplied by the transit time $t$ during which the ion is present between the plates, must move the ion horizontally the distance $d$ or $d = v_1 t$. The vertical acceleration applied to the ion is equal to the force due to the electric field $eV_0/a$ divided by the mass of the ions $m$. Accordingly, this acceleration is $$\frac{eV_0}{ma}$$

Obviously, in the same time $t$ that the ion traveled horizontally a distance $d$, it traveled vertically the distance $a$ between the plates so that $$a = \frac{1}{2}\left(\frac{eV_0}{ma}\right)t^2$$

The transit time can be eliminated between this last expression and the expression for the initial kinetic energy, to give the initial kinetic energy in terms of $V_1$. This expression is $$V_1 = \frac{eV_0}{4}\left(\frac{d}{a}\right)^2$$

Therefore, with a given ratio of $d$ to $a$ and accelerating potential between the plates of $V_0$, no ions with an initial kinetic energy less than $V_1$ can pass through the slit 29.

As the ionic initial kinetic energy becomes very large, the path by which ions possessing such energy can pass through both slits approaches a straight line. Some ions of every initial kinetic energy greater than $V_1$ can pass through the slits. Thus the slit system provides for the selective removal from the ionization zone of ions having initial kinetic energy greater than $V_1$. However, an upper limit of energy can be imposed by means of another slit which will limit the ion beam beyond slit 29. This is discussed in connection with Figure 8.

From a consideration of the ion ballistics of the slit system shown, it can be demonstrated that the angle $$\theta_2 = \tan^{-1}\frac{d}{2a}$$

The angle $\theta_1$ of the ions with maximum initial kinetic energy is similarly given by $$\theta_2 = \tan^{-1}\frac{d}{a}$$

This defines the divergence of the ion beam leaving the slit 29. Quite often in practice it is found that the divergence is too great and that the width of the ion beam should be reduced. This can be accomplished by placing a third plate with a slit below plate 28, as is shown in Figure 8. In such case, the range of initial kinetic energy of the ions in the beam passing this third plate is further limited. This limit can be computed in the manner outlined above.

Figure 8 is a diagram of a mass-spectrometer constructed in accordance with my invention, by means of which it is possible to measure the abundance of ions possessing initial kinetic energy, within predetermined range, or to determine both the relative abundance of ions possessing such a range of kinetic energy and those possessing no initial kinetic energy. For simplicity in representation, only certain of the essential elements for the mass-spectrometer are shown in this figure. Thus, for example, the evacuated system enclosing the mass-spectrometer proper is not shown. This is, of course, quite conventional. Ionization of the substance present in the gas stream takes place in zone 15 by means of electron bombardment, such as is shown in Figure 1. The positively charged ions are removed from this zone by means of the potential difference applied between plates 19 and 20 by means of a battery 31 or other source of potential. Plate 32, preferably substantially parallel to plate 20, is placed below this plate and the difference of potential due to battery 24 or other source of E. M. F. is applied between these plates. Two slits 23 and 29 are shown in plate 32. Ions having a range of initial kinetic energies determined by the distance $d$ of slit 29 from the vertical line 30, the spacing between plates 20 and 32, and the potential difference between these plates (supplied by battery 24), form a beam of ions 33. Another metal plate 34 disposed some distance below plate 32, contains a slit 35 which further limits the width of the beam of ions 33 and, therefore, the range of initial kinetic energies of the ions passing through this slit. Plate 34 can conveniently be maintained at the same potential as plate 32 if desired, by conductor 36. Slit 23 in plate 32 is directly below the slit 21 in plate 20, hence, through this slit pass ions of substantially zero kinetic energy, to form a beam 38. Thus, the apparatus described has drawn the positive ions from the ionizing zone 15 and selectively separated them into a beam of ions possessing substantially no initial kinetic energy, and a beam of ions possessing initial kinetic energies lying within a predetermined range.

It is now desirable to analyze either or both these beams to determine the relative abundance of ions having a specific ratio of $$\frac{\text{charge of ion}}{\text{mass of ion}}$$

In order to accomplish this, the beams of ions are deflected by means of a magnetic field of known intensity which focuses the ion beams having a given ratio of charge to mass on the collector systems. The magnetic field can be considered to be substantially uniform, at right angles to the plane of Figure 8, lying within the region defined by line 39. As shown, this magnetic field bends the ion beams through an angle of approximately 90°. Preferably a metal shield 40 with a curved section is disposed between the beams to see that there is no mixture of the ions forming the two beams, so that ions with a ratio of charge to mass such that they are not focused on one slit will not enter the other slit. Attached to this shield are plates 41 and 42 which contain the receiver slits 43 and 44 referred to just above. The ionic beam passing through these slits impinges upon collector cups 45 and 46 respectively. A sensitive current measuring device 47 is connected between plate 41 and collector cup 45 in series with a small difference of potential supplied by battery 48, which insures that the abundance of all ions entering the collector cup are measured. Similarly the abundance of ions entering collector cup 46 is measured by the sensitive current-measuring device 49, which is connected in series with a small battery 50 between collector cup 46 and plate 42. The shield 40 and plates 32, 34, 41 and 42 are maintained at the same potential, and may for example, be grounded. Quite often batteries 48 and 50 may be eliminated without altering the operation of the instrument.

With this arrangement, all ions having an initial kinetic energy lying within the predetermined range determined by the slit system 29 and 35, and having a given ratio of $$\frac{\text{charge of ion}}{\text{mass of ion}}$$

such that they are focused on the slit 44 by the magnetic field in the region 39, are measured by the current indicating device 49. Similarly and simultaneously the sensitive current indicating device 47 measures the abundance of the ions focused on slit 43 by the magnetic field causing the ions to travel along the path 38, in this case the ions possessing no initial kinetic energy. When $V_1$ (the E. M. F. of battery 31) is small compared to the accelerating potential $V_0$ applied between plate 20 and 32, maximum ion current for a given ratio of $$\frac{\text{charge of ion}}{\text{mass of ion}}$$

of the ions can be recorded simultaneously at both current measuring devices.

It is apparent that a further separation between ions of the same ratio of charge to mass, based upon differences in initial kinetic energy, could be made by providing another slit similar to slit 29 in plate 32, but spaced a different distance in this plate from the slit 23. In this case, of course, another collector cup and ion current indicating means must be supplied.

Figure 9 illustrated in chart form the action taking place in the slit system. Curve 27 on this chart has been reproduced from Figure 5 and represents the relative abundance of ions of O⁺ from NO, plotted as a function of the initial kinetic energy of the ions in the electron-volts. Curve 25 shows the relative abundance of ions of varying kinetic energy passing through slit 23. Curve 51 shows the relative abundance of ions of varying initial kinetic energy passing through slit 35. By multiplying the ordinates of curves 25 and 27, the ion current in beam 38 due to O⁺ from NO is obtained. This is shown in Figure 10. Similarly by multiplying the ordinates of curves 27 and 51, one obtains the ion current in beam 33 representing O⁺ from NO, as a function of the initial kinetic energy of the ion. A comparison of Figures 10 and 11 shows that the ion current in the beam 35 is much greater than in beam 38. Therefore, there should be a much greater reading of current measuring device 49 than of current measuring device 47, when measuring O⁺ obtained chiefly from the source-molecule NO in zone 15. On the other hand, if an analysis is being made of CO, the abundance of C⁺ ions in beam 38 will be high, as shown by Figure 4, while the ion current for the same ion in beam 33 will be very low, as illustrated in Figure 12. The data for Figure 12 were obtained by multiplying the ordinates of curve 26 of Figure 3 by those of curve 51 in Figure 9. Obviously, the relative magnitudes of the abundance of the particular ion in the two beams 33 and 38 give a definite indication as to the source-molecule from which the disassociated ion came. This apparatus, therefore, is capable of yielding measurements of more than twice as many parameters descriptive of the process of disassociation of molecules under electron impact as is the conventional mass-spectrometer. By this means ions can thus be uniquely identified. The analysis on the other hand can be made more accurate by avoiding the measurement of ions of small abundance. The concentration of the components in the initial gas mixture in zone 15 is carried out in the conventional fashion by the use of simultaneous equations for either mass-spectrum, or for both the mass-spectra from the readings of indicators 47 and 49 together, as is known in the art.

Figure 13 illustrates another embodiment of my invention, in this case a particularly advantageous type of ion source in which ions having no initial kinetic energy are not removed from the low pressure zone in which they are formed. The ion source may be considered to consist basically of three coaxial conducting cylinders. The innermost cylinder 53 is closed at one end by an insulating plug 54, through which the leads 55 from a filament 56 are brought in a vacuum tight manner. The opposite end of this cylinder is likewise sealed by an insulating plug 56 through which a metal bushing 57, carrying at its inner end a collecting cup 58, is attached. There are preferably at least three diaphragms 59, 60, and 61, mounted within cylinder 53. These are conducting metal plates transverse to the axis of the cylinder 53, each provided with a hole coaxial with the axis of cylinder 53. An entry tube 62, which is shown broken away, provides a means for introducing the desired substance which is to be analyzed into the ionization zone 15 within the cylinder 53. Obviously, this tube is attached to the source of the substance through suitable lines fitted with valves, all of which are well known in the prior art and which are, therefore, not shown in this application. A slit 63 is cut in the bottom center of the cylinder 53. This slit is narrow and its median plane is perpendicular to the axis of the cylinder. The length of this slit is largely a matter of convenience, and as shown in Figure 14, is defined by an arc $\beta$.

The second cylinder 64 is substantially coaxial with cylinder 53 and is of considerably greater diameter, although this dimension is not at all critical. The ends of the cylinder are made gas tight by conducting end plates 65, which are attached to the two cylinders 64 and 53. A slit 66, of approximately the same or a trifle greater width than that of slit 63, is cut in cylinder 64. The length of this slit is chosen such that the angle defined by this length is still the angle $\beta$.

The third cylinder 67 is likewise substantially coaxial with cylinder 53 and is separated from cylinder 64 by two rings of insulated material 68, which serve to seal off the annular space between rings 64 and 67 against leakage of air between the cylinders. Cylinder 67 is likewise provided with a slit 69, the width of which is approximately the same as that of slits 63 and 66, and the length of which, measured in terms of arc, is still substantially the angle $\beta$. The mass-spectrometer case 70 is attached to the cylinder 67 in such a fashion that it encloses the slit 69 and thereby renders the entire ionization system substantially vacuum tight.

In operation, the ion chamber, that is the zone 15 within cylinder 53, is maintained at a relatively low subatmospheric pressure, for example, of the order of 0.00001 mm. Hg to 0.01 mm. Hg, whereas the region beyond the slit 69, i. e., in the main case 70 of the instrument, is maintained at as low a pressure as can conveniently be attained. Filament 56 is heated by applying a difference of potential between the ends of the leads 55. A battery 71, or other source of E. M. F., is applied between the filament and the screen 59 to set up a positive field urging electrons emitted from the filament through the opening in screen 59. These relatively high speed electrons bombard the gas molecules present in the ionization zone 15, including the molecules of the substance to be analyzed, and thereby ionize such molecules. The electrons eventually are collected in the collector cup 58 and their abundance can be determined by the reading of the sensitive meter 72. It is apparent from the description above that there is essentially the same potential throughout the whole region within cylinder 64, and that, therefore, the zone 15 within cylinder 53 has substantially no electric field. Thus, no force is applied to the ions within this region, other than the force which was applied in the formation of the ions. Ions produced with no initial kinetic energy will not leave this region, but will eventually recombine and remain therein. On the average, ions which have initial kinetic energy move uniformly in all directions. A proportional part of the whole number of ions pass through slits 63 and 66. As soon as they pass slit 66, the ions are no longer in a zero electrostatic field, but are in the field due to a battery 73 or other source of E. M. F. which is applied between cylinders 64 and 67, thereby raising cylinder 64 to a high positive potential relative to cylinder 67, which for safety is usually grounded. The field set up by battery 73 applies a force to the ions which is practically radially outward from the small collision region. The separation of the slits 63 and 66 prevents penetration of the accelerating field into the collision region. Accordingly, this ion source produces a radially diverging beam of ions, in which ions of all initial kinetic energies except zero are represented in the proportion in which they are produced. No selective action exists when the ion possesses initial kinetic energy.

Once having removed the ions of initial kinetic energy from the subatmospheric ionization zone in which they were formed, it is necessary to focus them into a collecting cup, where ions of the same ratio of $$\frac{\text{charge of ion}}{\text{mass of ion}}$$

can be measured. There are numerous methods and associated apparatus by which the ion beam can be selectively separated into a plurality of beams, each a definite ratio of charge to mass, so as to produce the resultant mass-spectrum. Two particularly advantageous types, which in themselves form no part of my invention, are shown in Figures 15 and 16.

Figure 15:
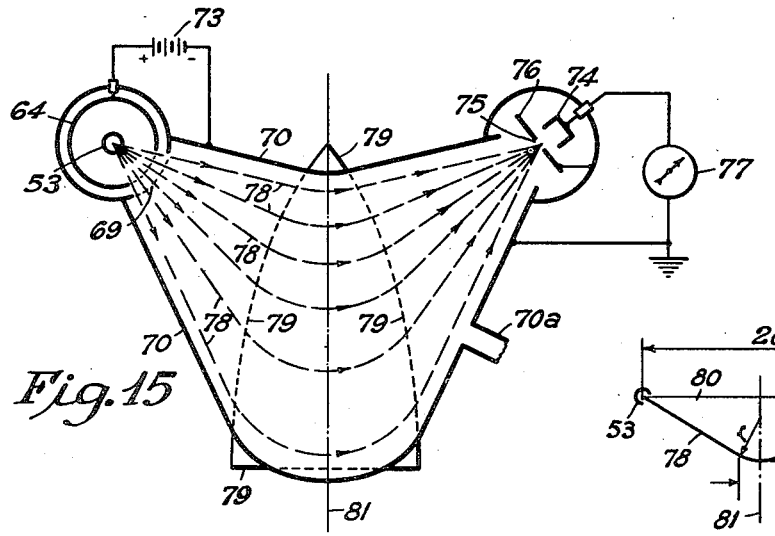
Figure 15 shows in diagrammatic form a special type of mass-spectrometer, constructed in accordance with my invention.
Figure 16:
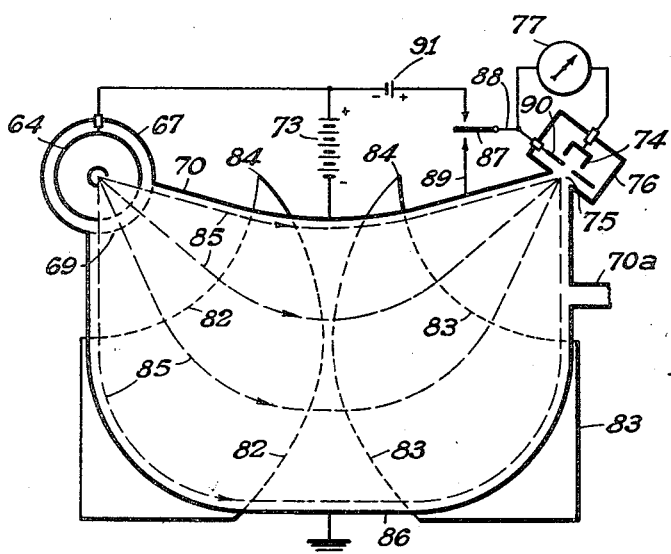
Figure 16 shows an alternative form of mass-spectrometer also constructed in accordance with my invention.

Figure 15 shows diagrammatically a mass-spectrometer using the ion source of Figures 13 and 14. Here many of the parts of the ion source have been eliminated for clarity in reproduction. The body or case 70 of the mass-spectrometer is shown in cross section. At right angles to the view given in Figure 15, the mass-spectrometer case would appear simply as a narrow rectangular trough. At the end of the body of the instrument opposite the ion source is a collector cup 74, positioned back of slit 75 in a plate 76, which is electrically connected to the conducting body 70. The collector cup 74, on the other hand, is brought out through a well insulated lead to a sensitive current measuring device 77 through which the current flows on its way to ground. This current measuring device is already well known in the art and may consist, for example, of an electrometer tube such as FP–54 tube, followed by a direct current amplifier and an indicating meter or a recorder.

In operation, the large tube 70a, connected to the body 70 of the mass-spectrometer, is attached to a vacuum pump, and the region within the body proper is evacuated as far as possible. The substance to be analyzed is then injected through the cylinder 53, for example, through the tube 62 shown in Figure 13, until the pressure within zone 15 builds up sufficiently for adequate ionization by bombardment with electrons from the filament 56. The resultant positive ions possessing initial kinetic energy stream through the slit 69 in cylinder 67 as described above in a widely divergent, practically radial beam. Ions of such a charge-to-mass ratio as to be focused on the slit 75 follow paths such as those shown by dotted lines 78. The process of focusing or mass analysis is accomplished by means of a uniform magnetic field with boundaries shaped in a "flat iron" pattern defined by line 79 in Figure 15. This field can be realized by the use of an electromagnet, the pole faces of which are uniformly spaced apart, and shaped in the form shown by line 79 in Figure 15. It can be shown that if the distance from the center line of symmetry 81 of the body to the slit 75 is approximately the same as that from this center line to the cylinder 53, that the shape of the field defined by line 79 can be determined mathematically.

Figure 15A:
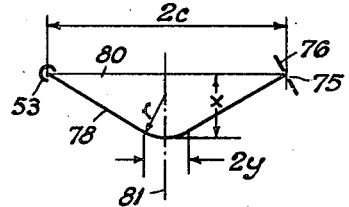
Figure 15A is a geometric construction used to determine the extent of the magnetic field or the spectrometer shown in Figure 15.

This is shown in Figure 15A. Here a line 80 has been drawn between the location of the center of cylinder 53 and slit 75. This line is perpendicularly bisected by line 81. The path of the ions is shown as line 78. Each such path is made up of three parts, i. e., a straight section at the start and a straight section at the finish where the ion beam is outside of the magnetic field, and a curved position within the limits of the region marked in Figure 15A as 2y, wherein the magnetic field is bending the beam. The amount of bending of the beam depends, of course upon the strength of the magnetic field and the velocity and charge of the particle, as is well known in the art. Knowing the distance between ion-source and collector and the initial direction of the ion with respect to the line connecting them, one can determine the radius of curvature r of the ion beam. If x is the distance from line 80 to the intersection of the ion path 78 with the perpendicular bisector 81 of the line 80, and if the distance between cylinder 53 and slit 75 is 2c, the width of the magnetic field 2y at this point is determined explicitly by the formula $$x(r^2-y^2)^{1/2} = (c-y)y$$

This equation defines the boundary of the magnetic field, outlined by the curved part of line 79. The magnetic field extends beyond the edge of the pole face a distance approximately equal to the separation of the pole faces.

In operation of the device, the magnetic field may be varied, thus focusing the ions of initial kinetic energy with a specific ratio of charge to mass on the collector cup, one after another, and the data for the mass-spectrum determined from the ions possessing initial kinetic energy are then read from meter 77. Alternatively, manipulation of the electric field by changing the potential difference between cylinders 64 and 67 may be employed in a manner well known in the art, and this technique is usually preferred to the variation of the magnetic field.

The mass-spectrometer shown in Figure 16 permits a much sharper focus for the ions of initial kinetic energy than the instrument shown in Figure 15. Here the magnetic field is in two parts, one having the boundary indicated by a line 82 and the other having the boundary indicated by line 83. The field is substantially uniform at right angles to the illustration shown in Figure 16. The pole faces are shaped so that the outer boundaries of the magnetic field are circles with their centers respectively at the center of cylinder 53 and slit 75 and their radii equal to the radius of curvature r of the ionic trajectories in the magnetic field. The inner boundary of each part of the field is an arc of a circle intersecting the outer boundary at points 84 on an imaginary line drawn between the center of cylinder 53 and slit 75, with center a distance r below the cylinder 53, or the slit 75, respectively. The shape of the pole pieces in Figure 16 is described in the article "A high intensity mass-spectrometer" by Smyth, Rumbaugh, and West, Physical Review, vol. 45, page 724 (1934).

With the arrangement of magnetic field shown in Figure 16, the ions possessing initial kinetic energy which are sent out radially along paths 85 from cylinder 53 by the field applied between cylinders 64 and 67, are twice deflected magnetically and are focused in the region adjoining plate 76 which closes the end of the body 86 of the mass-spectrometer proper. Those of a given ratio of charge to mass determined by the strength of the magnetic field and the electric potential applied by battery 73, or other source of potential, pass through slit 75 in plate 76. If an indication is produced of the total number of ions passing through slit 75, as a function of the ratio of charge to mass, a mass-spectrum is obtained similar to that for the instrument shown in Figure 15. In order to accomplish this, the single pole double throw switch 87 is thrown down, connecting conductor 88 to conductor 89 which is connected to the body of the instrument 86 and which in turn is preferably grounded. In this case, nearly all of the ions passing through slit 75 arrive at the collector cup 74 and are indicated by passing through a very sensitive current indicating device 77. A description of one preferred form of this device has already been given.

However, more information can be obtained with the instrument shown in Figure 16 than for that shown in Figure 15. This is accomplished by placing between plate 76 and collector cup 74 a second plate 90, insulated from the case 86 and containing a slit aligned between slit 75 and collector cup 74. This cup is connected through an insulated wire to conductor 88. If switch 87 is thrown to the top position it is connected through a battery or other source of potential 91 to cylinder 64 in the ionization system. Ions passing through slit 75, therefore, cannot pass through the slit in plate 90 unless they possess a greater kinetic energy (measured in electron-volts) than the potential of batteries 73 and 91. Under this circumstance, the ions still reaching the collector cup 74 are only those with an initial kinetic energy in electron-volts greater than the potential of source 91. Therefore, when the switch 87 is thrown in the up position a mass-spectrum can be obtained by suitable manipulation of the electric and magnetic field of the mass-spectrometer, in a manner already known in the art, which will indicate the relative magnitude of ions which have an initial kinetic energy greater than a predetermined value set by the potential of source 91. The potential of this source can be changed at will, thus giving a large range to the mass-spectra which can be obtained by measuring the relative abundance of ions having this initial kinetic energy. Measurements with a retarding field yield curves like curves 26 and 27 of Figures 3 and 5, respectively (or their integrals, that is curves of abundance of ions having initial kinetic energy greater than a given value). For each ion of each molecular species there exists such a curve, characteristic of the ion and of its source-molecule. Thus, one distinguishes between the source-molecules of a given ion, and even determines their concentrations quantitatively, by selecting a number of values of initial kinetic energy, obtaining the resultant mass-spectra and setting up simultaneous equations in terms of the measured ion abundance at these values, in a manner which is apparent from the present state of the mass-spectrometric art.

Figures 17, 18:
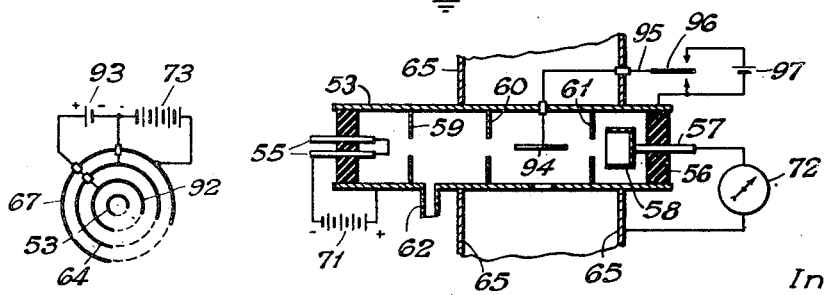
Figure 17 illustrates an alternative and particularly advantageous form of ion source in accordance with my invention.
Figure 18 is a cross-section of an ion source for a mass-spectrometer which is a modification of that shown in Figure 13.

An alternative system for obtaining the measurement of the relative abundance of ions having initial kinetic energies greater than a certain predetermined value, is shown in Figure 17. In this figure the ionization system has been slightly changed by placing a cylinder 92 between cylinders 53 and 64, but insulated electrically from these cylinders. This extra cylinder is slit in the same manner as cylinders 64 and 67. To this cylinder is applied a potential which is positive with respect to cylinders 53 and 64, thus applying a retarding field (for positive ions) between cylinder 53 through which ions possessing initial kinetic energy are streaming, and cylinder 92. The positive ions which pass cylinder 92 are, therefore, those possessing an initial kinetic energy in electron-volts greater than the potential of the source 93. In case the arrangement shown in Figure 17 is used in the spectrograph shown in Figure 16, there is no need to employ the slitted plate 90. This ionization system shown in Figure 17 can be employed with the apparatus shown in Figure 15 to obtain the same type of results which can be obtained with the apparatus shown in Figure 16. In these cases, since the ions possessing a lower initial kinetic energy than the predetermined minimum set by source 93 cannot enter the main body of the spectrograph, there is no need of retarding the ions at the collector cup.

Utilizing the apparatus just described, the number of compounds, the concentration of which can be determined by mass-spectrometric analysis of a mixture, is thus increased, and it also becomes possible to use for analysis only the most abundant ions in the mass-spectra by considering each in terms of its distribution in initial kinetic energy. One can also measure the abundance of ions without initial kinetic energy, utilizing in general the apparatus of either Figure 15 or 16, by slightly modifying the ionization system shown in Figures 13 and 14. Such a modification is shown in Figure 18 which shows in part the apparatus more completely illustrated in Figure 13. There is a change in that in the central cylinder 53 of the ion source has been placed an electrode 94, insulated from cylinder 53. This electrode is connected by the suitable insulated lead 95 to a single pole double throw switch 96, across the poles of which is connected a source of potential 97. The negative side of the source 97 is connected to the cylinder 53. When the switch 96 is thrown in the downward position the electrode 94 is at the same potential as cylinder 53, and the action of the ion source is substantially identical to that shown in Figure 13, i. e., only ions possessing initial kinetic energy pass out through the slit 63 in cylinder 53. If switch 96 is thrown in the up position, electrode 94 is at a slightly positive potential with respect to cylinder 53, so that positive ions possessing no initial kinetic energy are drawn toward slit 63 and pass therethrough. Normally, a potential difference of the order of a volt or two is sufficient to cause a substantial number of positive ions of zero initial kinetic energy to pass through slit 63. If electrode 94 is a rod concentric with cylinder 53, the field applied to the ions is still radial, although the distribution of ions passing from slit 65 and possessing initial kinetic energy, is somewhat distorted. Accordingly, the measurement of relative abundances of ions possessing initial kinetic energy and possessing zero kinetic energy is only approximate, and does not possess the accuracy of measurement obtained for ions of initial kinetic energy when utilizing the ion source shown in Figure 13. On the other hand, the apparatus can be conveniently set up to use the field due to electrode 94 or not, at the will of the operator, by suitable manipulation of switch 96.

It is apparent from the above description that the invention is capable of numerous modifications, each of which possesses definite advantages over ionic analyzers previously known in the art. The invention is not limited to the application thereof shown in this specification, but is best defined by the scope of the appended claims.

I claim:

1. An ion source for a mass spectrometer including a low-pressure zone, means for admitting into said zone a substance to be analyzed, means for bombarding at least part of said zone with electrons whereby ionization of said substance is effected to produce ions having no initial kinetic energy and ions having finite initial kinetic energy, a first electrode at least in part bounding said zone and having a slit through which ions formed in said zone may pass, a second electrode adjacent said first electrode and exterior of said zone, a slit in said second electrode displaced from a projection of the slit in said first electrode on said second electrode, said projection being normal to said first electrode for passing only ions possessing initial kinetic energy, and means for maintaining said electrodes at different electric potentials, thereby defining a path between said slits along which said last-mentioned ions can pass.

2. Apparatus according to claim 1 in which said first and second electrodes are substantially plane and parallel, and in which said second slit is parallel to said first slit but displaced from the intersection on said second electrode of an imaginary line passing through the center of said first slit at right angles to the plane of said first electrode.

3. An ion source for a mass-spectrometer including a low pressure zone, means for admitting a substance to be analyzed into said zone, means for bombarding at least part of said zone with electrons, whereby ionization of said substance is effected, a pair of approximately parallel plane electrodes one of which defines a first slit the long axis of which substantially parallel to the direction of motion of said electrons, said electrodes being positioned on opposite sides of said zone, means for applying a difference of potential between said electrodes, a third plane electrode defining a second slit the dimensions of which are approximately equal to those of said first slit, said third electrode being positioned adjacent the one of said pair of electrodes defining said first slit and substantially parallel thereto, in such a manner that said first and second slits are parallel, with said second slit displaced from an imaginary line passing through the center of said first slit at right angles to the electrode defining said first slit, and means for applying a difference in potential between said electrode defining said first slit and said third electrode.

4. Apparatus according to claim 3 in which said third electrode defines additionally a third slit the dimensions of which are approximately equal to those of said first slit, said slit being parallel to said first slit and centered on said imaginary line.

5. A mass-spectrometer including an ion source, said source comprising an ionization zone maintained at subatmospheric pressure, means for ionizing the gas in said zone by electron bombardment, a first and a second electrode which are plane parallel plates disposed on opposite sides of said zone and maintained at a difference of potential with said second electrode negative with respect to said first electrode, said second electrode defining a slit the long axis of which is approximately parallel to the direction of motion of said electrons, a third electrode which is a plane plate parallel to and adjacent said second electrode, said third electrode defining a second and a third slit, both of which are approximately parallel to said first slit, said second slit being displaced at right angles to the long axis of said second slit from an imaginary line central with said first slit and at right angles to said second electrode, said third slit being centered on said imaginary line, and means for raising said third electrode to a negative potential with respect to said second electrode, whereby positive ions of zero initial kinetic energy form a beam passing through said first and third slits, and positive ions of initial kinetic energy greater than a predetermined minimum value form a second beam passing through said first and second slits, said spectrometer including in addition to said source an evacuated body attached to said source, through which pass said ion beam and said second ion beam; a curved conducting shield in said body separating said beam and said second beam, two means for measuring a quantity proportional to the number of ions in a beam per second, each of which includes an ion collector disposed within said body and an associated electrode in front of said collector defining a slit through which ions pass to said collector, said collectors and associated electrodes being disposed on opposite sides of said shield with said electrodes connected thereto, and means for producing a magnetic field in said body in the region of the curved portion of said shield whereby ions in each of said beams with a predetermined ratio of charge to mass are curved approximately parallel to said shield and focused on said slits in said associated electrodes.

SAMUEL S. WEST.

REFERENCES CITED

The following references are of record in the file of this patent:

UNITED STATES PATENTS

| Number | Name | Date |
|---|---|---|
| 2,221,467 | Bleakney | Nov. 12, 1940 |

OTHER REFERENCES

Technical publication, "An Experimental Mass Spectrometer," by N. D. Coggeshall and E. B. Jordan in Review of Scientific Instruments, vol. 14, No. 5, May 1943, pages 125–129.

Technical publication, "The Mass-Spectrograph and Its Uses," by Walker Bleakney, in American Physic Teacher, vol. 4, Feb. 1936, pages 12–23.